United States Patent
Yabe

(10) Patent No.: US 7,327,441 B2
(45) Date of Patent: Feb. 5, 2008

(54) DISTANCE MEASURING SYSTEM

(75) Inventor: Masaaki Yabe, Itabashi-ku (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 11/243,262

(22) Filed: Oct. 4, 2005

(65) Prior Publication Data
US 2006/0072100 A1 Apr. 6, 2006

(30) Foreign Application Priority Data
Oct. 6, 2004 (JP) ............................. 2004-293360

(51) Int. Cl.
*G01C 3/08* (2006.01)
(52) U.S. Cl. .................................... 356/4.04
(58) Field of Classification Search ................ 356/4.04
See application file for complete search history.

(56) References Cited

U.S. PATENT DOCUMENTS 4,167,329 A * 9/1979 Jelalian et al. ............. 356/5.09

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A distance measuring system, comprising a laser light source for projecting a pulsed laser beam to an object to be measured, a photodetection element for receiving an external light reflected by the object to be measured and an internal light which is a divided part of said laser beam, a photodetection element including said photodetection element, and a control arithmetic unit for calculating a distance based on photodetection of the external light and the internal light received by said photodetection element, wherein said photodetection circuit forms non-detecting condition, and the non-detecting condition is formed before or after photodetection timing of the internal light.

8 Claims, 8 Drawing Sheets

DISTANCE MEASURING SYSTEM

BACKGROUND OF THE INVENTION

The present invention relates to a distance measuring system with an electro-optical (light wave) distance measuring unit.

An electro-optical distance measuring unit provided in a distance measuring system is described, for instance, in the Japanese Patent Publication JP-A-2004-144681.

In FIG. 8, reference numeral 1 denotes an electro-optical distance measuring unit. The electro-optical distance measuring unit 1 comprises an optical system 2 and a distance measuring arithmetic unit 3.

The optical system 2 comprises a distance measuring light optical path 4 and an internal reference light optical path 5. On the distance measuring optical path 4, there are arranged a laser light source 6, a right angle reflection mirror 7, an objective lens 8, and a photodetection element 9. The laser light source 6 is a pulsed laser diode (PLD), for instance. From the laser light source 6, a distance measuring light, which is a pulsed laser beam, is emitted. The distance measuring light is deflected by the right angle reflection mirror 7, and the distance measuring light is projected from the electro-optical distance measuring unit 1 through the objective lens 8. The distance measuring light thus projected is reflected by a prism, which is an object to be measured 11. The reflected distance measuring light enters via the objective lens 8, and the reflected distance measuring light is then deflected by the right angle reflection mirror 7 and is received by the photodetection element 9.

On the distance measuring light optical path 4, a half-mirror 12 is arranged. By the half-mirror 12, a part of the distance measuring light is reflected as an internal reference light. The internal reference light is deflected by a reflection mirror 13, and the internal reference light optical path 5 is formed. Relay lenses 14 and 15 are provided on the internal reference optical path 5. After passing through the relay lens 15, the internal reference light 5 is deflected by a reflection mirror 16. The internal reference light 5 is then reflected by a half-mirror 17 arranged on the distance measuring optical path 4 on the distance measuring light optical path 4 and is received by the photodetection element 9.

An optical path switchover unit 18 is provided so as to stretch over the outgoing course of the distance measuring light optical path 4 and the internal reference light optical path 5. A light amount adjusting device 19 is provided so as to stretch over the returning course of the distance measuring light optical path 4 and the internal reference light optical path 5.

The optical path switchover unit 18 is comprises a rotating light shielding plate 21. When the light passes through one of the distance measuring light optical path 4 and the internal reference light optical path 5, the light shielding plate 21 shuts off the other of the optical paths. The rotating light shielding plate 21 is rotated by an actuator 22 such as a motor, etc. The light amount adjusting device 19 comprises a light amount attenuation filter 23. The light amount attenuation filter 23 is rotated by an actuator 24 such as a motor, etc., and the light amount is adjusted in such manner that the intensity of the distance measuring light entering the photodetection element 9 is to be equivalent to the intensity of the internal reference light.

The distance measuring light and the internal reference light received by the photodetection element 9 are sent to the distance measurement arithmetic unit 3 as photodetection signals.

As the optical paths are switched over by the optical path switchover unit 18, the distance measuring light and the internal reference light separated in time series enter alternately the photodetection element 9, and the photodetection signal of the distance measuring light and the photodetection signal of the internal reference light are alternately sent to the distance measurement arithmetic unit 3 from the photodetection element 9. At the distance measurement arithmetic unit 3, pulses of the distance measuring light and pulses of the internal reference light are compared with each other, and the deviation is calculated. Based on the deviation thus obtained, a distance to the object to be measured 11 is calculated.

In the electro-optical distance measuring unit 1 of a conventional type distance measuring system as described above, the distance measuring light and the internal reference light are mechanically switched over by the rotating light shielding plate 21. For instance, optical paths are switched over every one second, i.e. the distance measuring light is received for a second, and the internal reference light is received for the next second. When optical paths are mechanically switched over, there are such problems that there are limitations in the factors such as responsiveness of the motor. The switchover at high speed is very difficult to perform and influence of drift in a circuit unit of the distance measurement arithmetic unit 3 is not negligible, and the drift exerts influence on accuracy of distance measurement.

Further, during the switchover, there is also dead time when neither the distance measuring light nor the internal reference light is received, and the effective time for measurement is reduced. When the entire measurement time is reduced by switching over at high speed, there is such problem that an amount of measurement data acquired is decreased.

SUMMARY OF THE INVENTION

It is an object of the present invention to provide a distance measuring system, by which it is possible to eliminate mechanical switchover of optical paths, to electrically discriminate a photodetection signal of a distance measuring light from a photodetection signal of an internal reference light, and also to measure a distance at high speed, and to improve accuracy of measurement by eliminating influence of drift. Further, a mode of discrimination of the photodetection signal of the distance measuring light from the photodetection signal of the internal reference light is made variable, and the measurement at higher speed and the prevention of erroneous measurement caused by unnecessary object can be attained.

To attain the above object, the present invention provides a distance measuring system, comprising a laser light source for projecting a pulsed laser beam to an object to be measured, a photodetection element for receiving an external light reflected by the object to be measured and an internal light which is a divided part of the laser beam, a photodetection circuit including the photodetection element, and a control arithmetic unit for calculating a distance based on photodetection of the external light and the internal light received by the photodetection element, wherein the photodetection circuit forms non-detecting condition, and the non-detecting condition is formed before or after photodetection timing of the internal light.

Also, the present invention provides a distance measuring system for measuring a distance based on photodetection of an external light and an internal light by projecting a pulsed laser beam to an object to be measured, and by receiving the external light reflected by the object to be measured and the internal light which is a divided part of the laser beam, comprising a laser light source for emitting the pulsed laser beam based on a light emission instruction, a photodetection element capable to receive the external light and the internal light, an optical system where the external light and the internal light enter the photodetection element at the same time, a photodetection control unit for controlling photodetecting condition of the photodetection element, and a light emission and photodetection timing control unit for issuing a ready signal based on the light emission instruction, wherein the photodetection control unit enables the photodetection element to receive a first pulsed laser beam entering after the ready signal based on the ready signal, and the light emission and photodetection timing control unit generates the ready signal before or after a time the photodetection element receives the internal light. Further, the present invention provides the distance measuring system as described above, wherein the ready signal is issued alternately before and after the time when the photodetection element receives the internal light. Also, the present invention provides the distance measuring system as described above, wherein there are more ready signals issued after the time when the photodetection element receives the internal light than the ready signals issued before the time when the photodetection element receives the internal light. Further, the present invention provides the distance measuring system as described above, wherein time difference between the ready signal issued after the time when the photodetection element receives the internal light and the ready signal issued before the time when the photodetection element receives the internal light is made changeable with respect to the ready signals. Also, the present invention provides the distance measuring system as described above, further comprising a focusing unit, wherein a control unit calculates a distance to the object to be measured from a feedback signal of the focusing condition by the focusing condition, and a ready signal is issued based on the result of calculation.

According to the present invention, in a distance measuring system which comprises a laser light source for projecting a pulsed laser beam to an object to be measured, a photodetection element for receiving an external light reflected by the object to be measured and an internal light which is a divided part of the laser beam, a photodetection circuit including the photodetection element, and a control arithmetic unit for calculating a distance based on photodetection of the external light and the internal light received by the photodetection element, the photodetection circuit forms non-detecting condition, and the non-detecting condition is formed before or after photodetection timing of the internal light. As a result, photodetection of the internal light and photodetection of the external light can be electrically switched over at high speed, and the dead time during the switchover is eliminated. This contributes to the improvement of measurement efficiency. Thus, it is possible to perform measurement with high accuracy within short time, and to eliminate the influence of drift at the distance measuring unit because the measurement time is reduced. As a result, measurement accuracy and reliability can be improved.

According to the present invention, in a distance measuring system for measuring a distance based on photodetection of an external light and an internal light by projecting a pulsed laser beam to an object to be measured, and by receiving the external light reflected by the object to be measured and the internal light which is a divided part of the laser beam, comprising a laser light source for emitting the pulsed laser beam based on a light emission instruction, a photodetection element capable to receive the external light and the internal light, an optical system where the external light and the internal light enter the photodetection element at the same time, a photodetection control unit for controlling photodetecting condition of the photodetection element, and a light emission and photodetection timing control unit for issuing a ready signal based on the light emission instruction, the photodetection control unit enables the photodetection element to receive a first pulsed laser beam entering after the ready signal based on the ready signal, and the light emission and photodetection timing control unit generates the ready signal before or after a time when the photodetection element receives the internal light. As a result, photodetection of the internal light and photodetection of the external light can be electrically switched over at high speed, and the dead time during the switchover is eliminated. This contributes to the improvement of measurement efficiency. Thus, it is possible to perform measurement with high accuracy within short time, and to eliminate influence of drift at the distance measuring unit because the measurement time is reduced. As a result, measurement accuracy and reliability can be increased.

According to the present invention, in the distance measuring system as described above, the ready signal is issued alternately before and after the time when the photodetection element receives the internal light, and also wherein there are more ready signals issued after the time when the photodetection element receives the internal light than the ready signals issued before the time when the photodetection element receives the internal light. Thus, by adjusting the number of the photodetecting operations of the external light to match the measurement condition, it is possible to accomplish measuring operation with higher efficiency such as improvement of measurement accuracy within a predetermined time and reduction of measurement time.

BRIEF DESCRIPTION OF THE DRAWINGS

FIG. 6 (B) is a diagram to show photodetecting condition of a photodetection element; FIG. 6 (C) and FIG. 6 (D) each represents a diagram to show photodetection timing of an internal light and an external light at the photodetection element; and FIG. 6 (E) is a diagram to show photodetection timing of the photodetection element at the time of measurement;

DETAILED DESCRIPTION OF THE PREFERRED EMBODIMENTS

Figure 1:
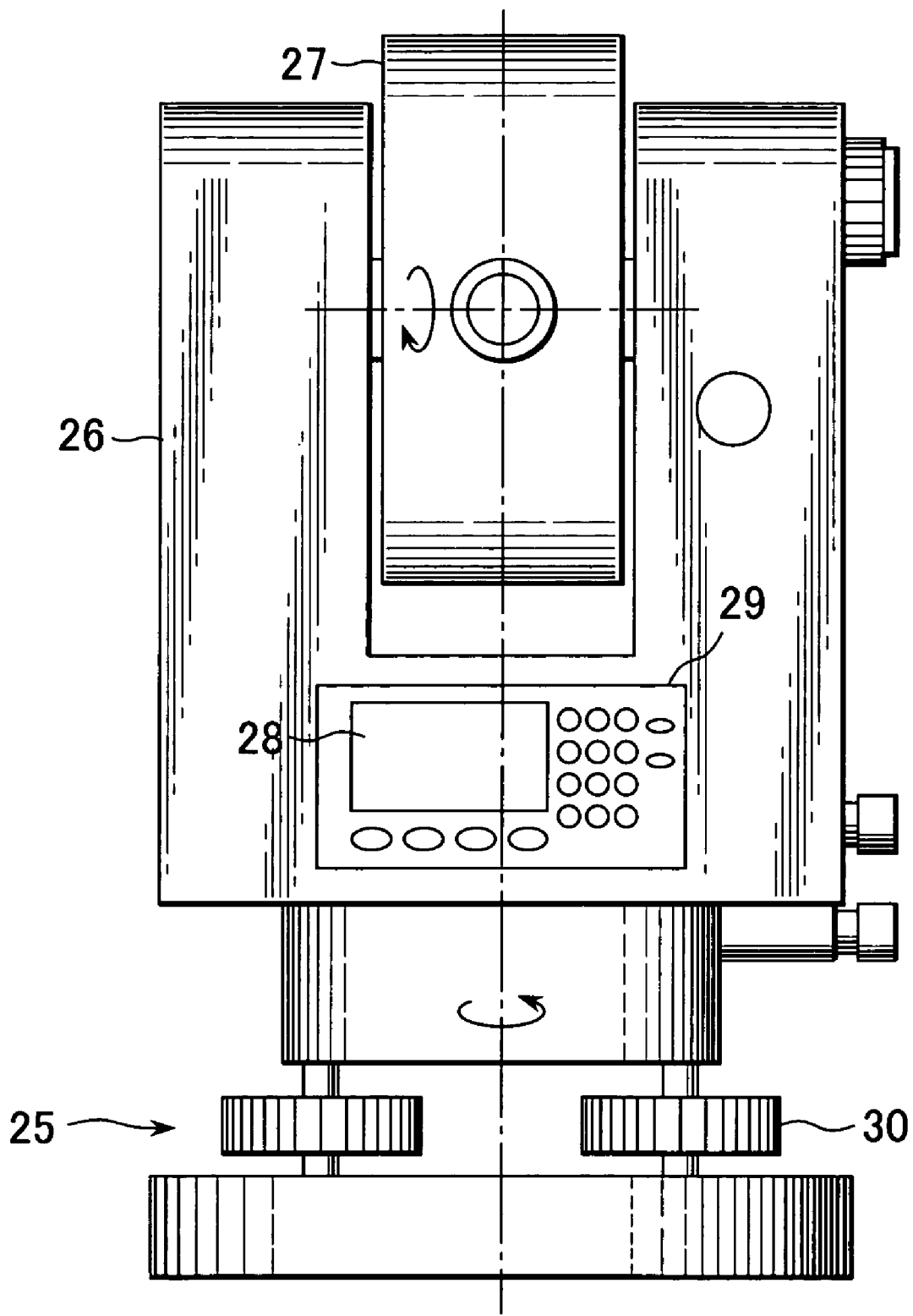
FIG. 1 is a front view of an example of a distance measuring system in which the present invention is practiced.

Description will be given below on the best mode to carry out the present invention referring to the drawings.

FIG. 1 shows an example of a distance measuring system according to the present invention.

A frame unit 26 is installed on a base unit 25, which is mounted on a tripod (not shown). A telescope unit 27 including an optical system is supported on the frame unit 26. The base unit 25 has leveling screws 30 so that leveling can be performed in such manner that the frame unit 26 is maintained at horizontal position. The frame unit 26 can be rotated around a vertical axis, and the telescope unit 27 can be rotated around a horizontal axis. An operation input unit 29 with a display unit 28 is mounted on the frame unit 26, and measured values, etc. such as a distance to an object to be measured are displayed on the display unit 28.

Next, description will be given below on approximate arrangement of the distance measuring system, referring to FIG. 2.

The distance measuring system comprises a control arithmetic unit 31, a distance measuring unit 32, an angle measuring unit 33, and a focusing unit 34. A storage unit 35, a data input/output unit 36, the operation input unit 29, and the display unit 28 are connected to the control arithmetic unit 31.

The distance measuring unit 32 drives and controls a laser light source 6. A distance measuring light emitted from the laser light source 6 is projected to a prism, i.e. an object to be measured 11, via an optical system 37. A distance measuring light reflected by the object to be measured 11 is received by a photodetection element 9 via the optical system 37. A photodetection signal is inputted to the distance measuring unit 32. A distance to the object to be measured 11 is calculated at the distance measuring unit 32, and a result of calculation is inputted to the control arithmetic unit 31.

A detection signal from a vertical angle encoder 38 to detect a tilt angle of the telescope unit 27 is inputted to the angle measuring unit 33, and a detection signal from a horizontal angle encoder 39 to detect a rotation angle of the frame unit 26 is inputted to the angle measuring unit 33. An angle in a collimating direction under the condition to collimate the object to be measured 11 by the telescope unit 27 is measured, and a result of the measurement is inputted to the control arithmetic unit 31.

The focusing unit 34 performs automatic focusing for the telescope unit 27. Focusing operation is controlled by the control arithmetic unit 31, and focusing condition is fed back to the control arithmetic unit 31. Programs such as a sequence program, a distance calculating program, etc. required for distance measuring operation are stored in the storage unit 35.

The control arithmetic unit 31 controls the entire distance measuring system, and displays distance measurement results from the distance measuring unit 32 and results of angle measurement of a vertical angle and a horizontal angle from the angle measuring unit 33 on the display unit 28.

Figure 3:
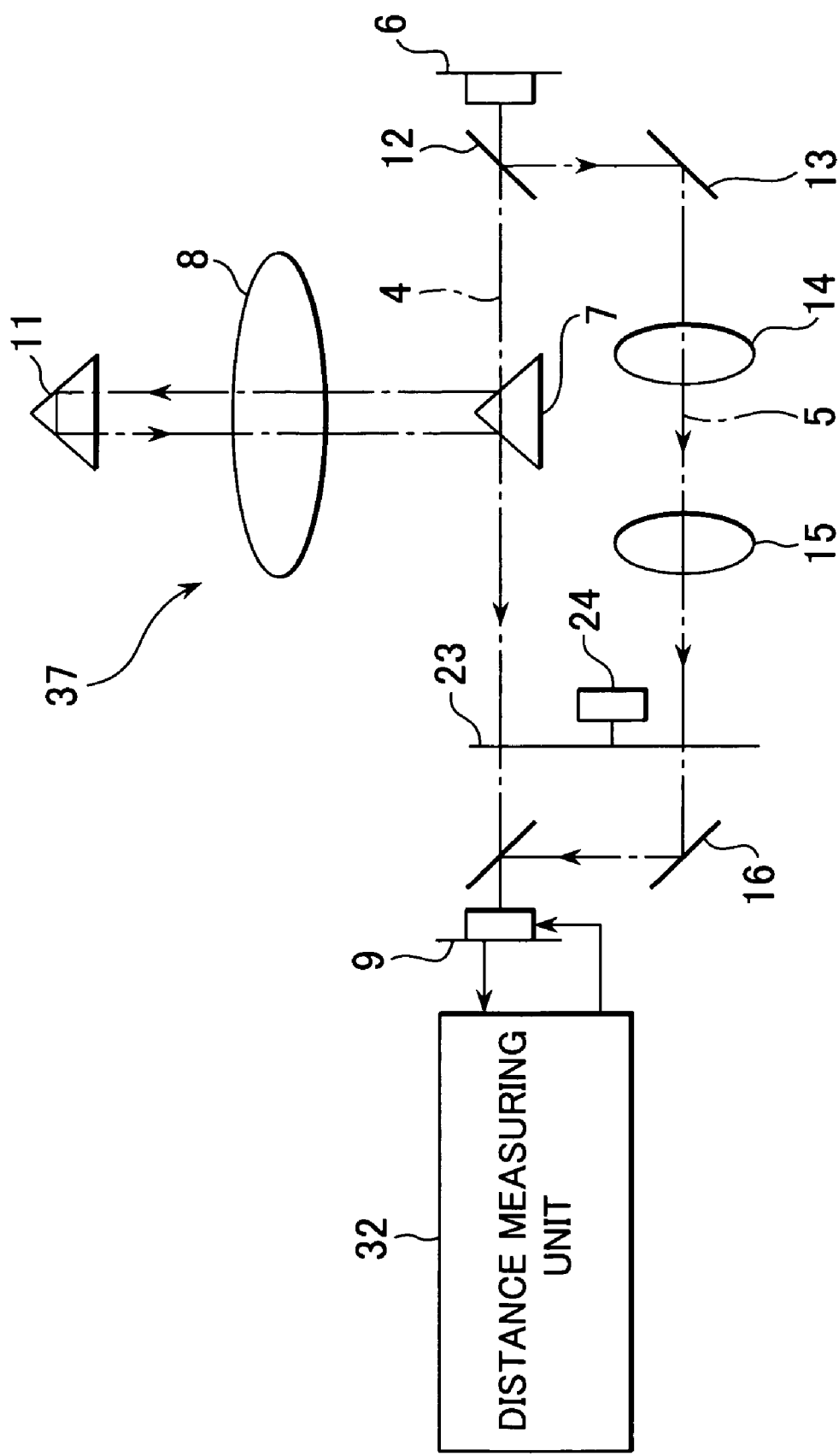
FIG. 3 is a schematical drawing to show an arrangement of an optical system in the embodiment of the invention.
Figure 8:
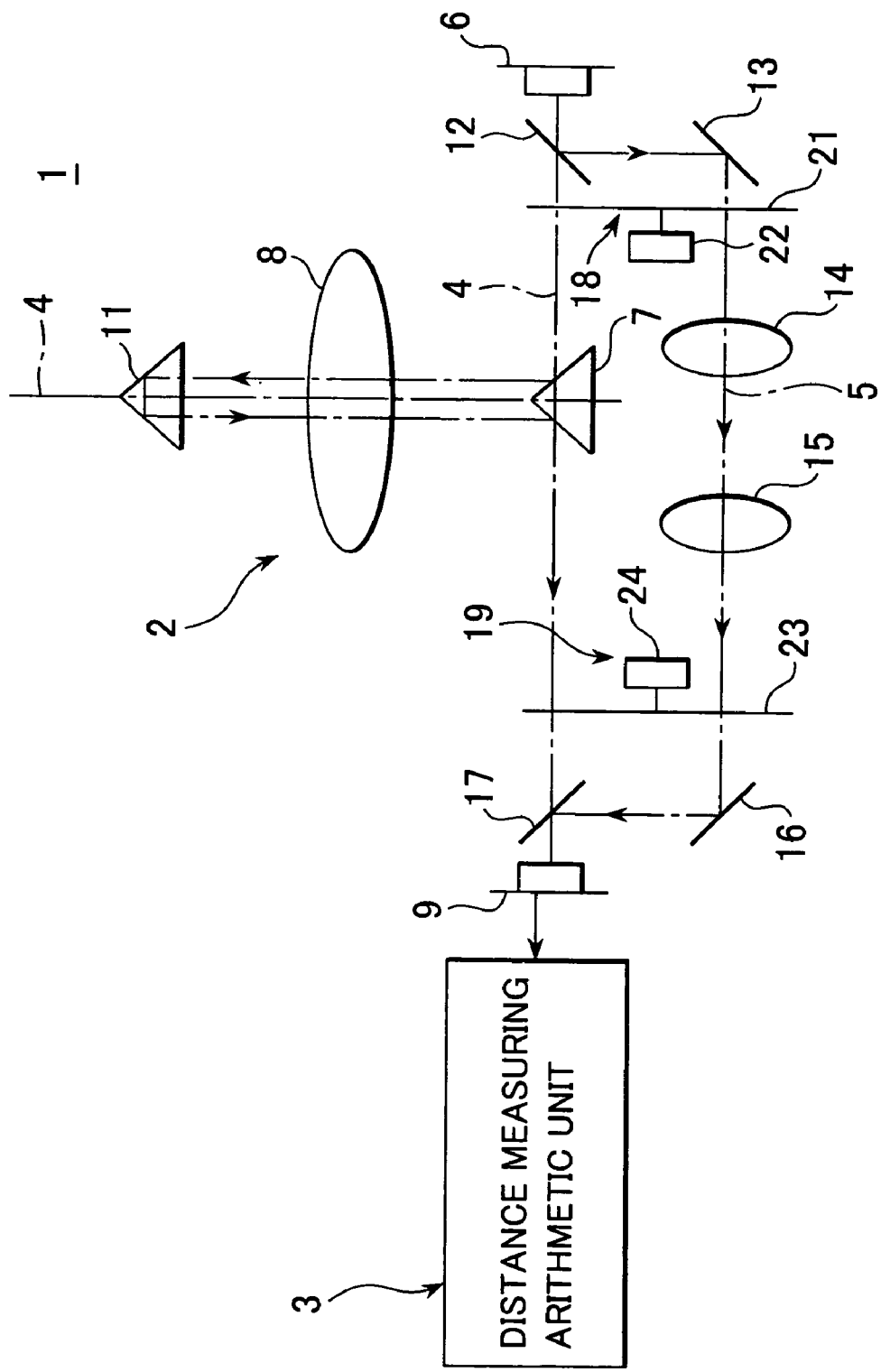
FIG. 8 is a schematical drawing of a conventional type optical system.

FIG. 3 shows the optical system 37 in the present embodiment. In FIG. 3, the same component as shown in FIG. 8 is referred by the same symbol.

The optical system 37 in the present embodiment has almost the same arrangement as the arrangement of the optical system 2 described in connection with FIG. 8, and the optical path switchover unit 18 is not provided in the optical system 37. Therefore, a distance measuring light and an internal reference light enter the photodetection element 9 at the same time. Detecting condition on the photodetection element 9 is electrically limited by a photodetection circuit 40 of the distance measuring unit 32, and the photodetection element 9 is controlled so as to discriminate and detect to the distance measuring light and the internal reference light. From the photodetection element 9, a photodetection signal of the distance measuring light and a photodetection signal of the internal reference light are discriminated from each other and are outputted.

Figure 4:
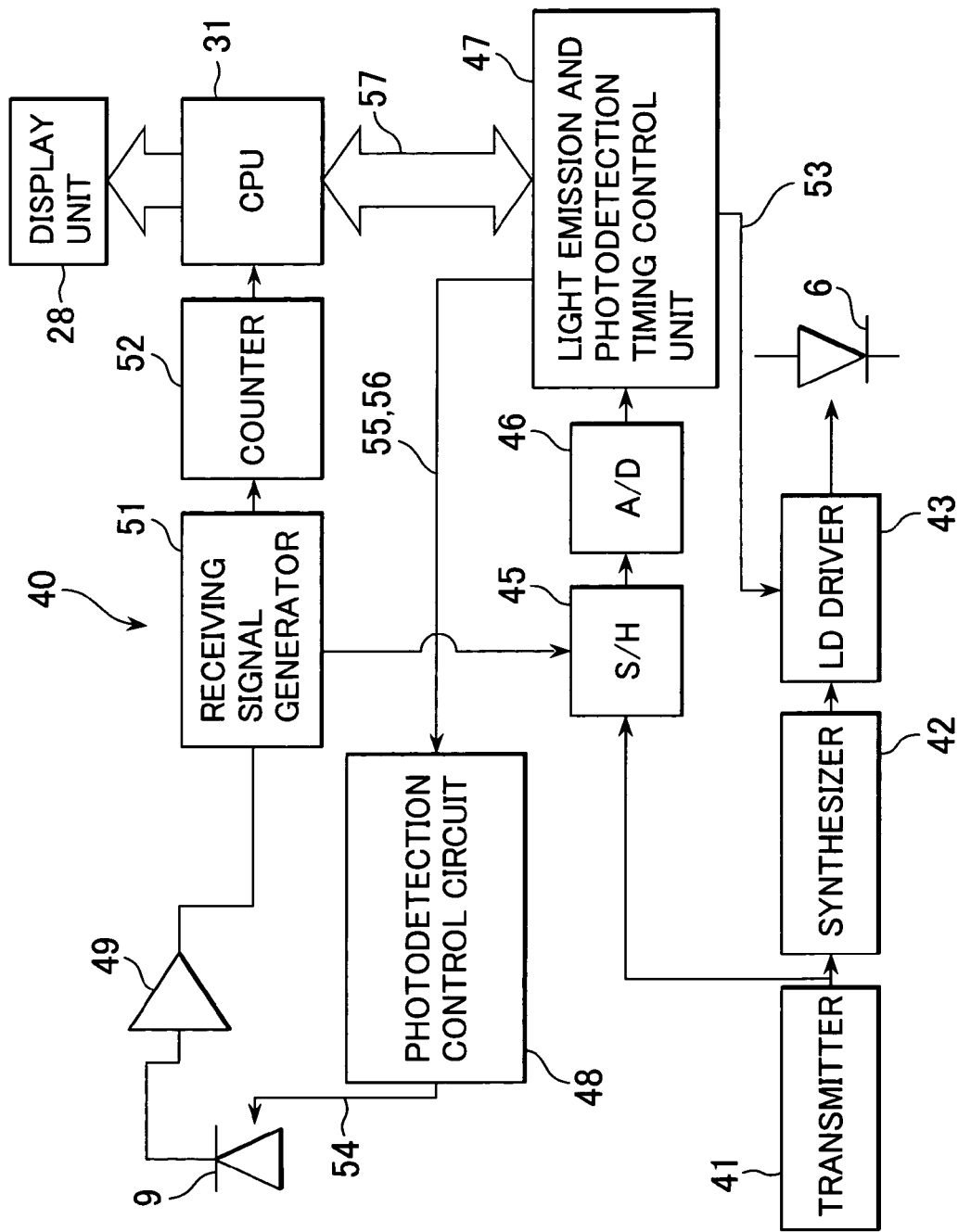
FIG. 4 is a block diagram of a photodetection circuit of the present embodiment.

Now, description will be given on the photodetection circuit 40 referring to FIG. 4.

A clock signal from a transmitter 41 is converted by a synthesizer 42 to a pulse train signal of a predetermined frequency, e.g. 8000 Hz to 9000 Hz, and is outputted, and the pulse signal is sent to an LD driver 43. A light emission timing control signal 53 from a light emission and photodetection timing control unit 47 as described later is inputted to the LD driver 43. When the light emission timing control signal 53 is inputted, the LD driver 43 is synchronized with the pulse signal, and the laser light source 6 is driven. Then, a pulsed laser beam is emitted from the laser light source 6.

The clock signal from the transmitter 41 is sent to a sample hold circuit 45. A data sampled at the sample hold circuit 45 is converted to a digital data by an A/D converter 46, and the data is sent to the light emission and photodetection timing control unit 47.

From the light emission and photodetection timing control unit 47, a reset signal 55 and a ready signal 56 (to be described later) are sent out together with the light emission timing control signal 53, and the reset signal 55 and the ready signal 56 are inputted to the photodetection control circuit 48. Based on the reset signal 55 and the ready signal 56, the photodetection control circuit 48 controls photodetecting condition of the photodetection element 9.

As the photodetection element 9, an APD (avalanche photodiode) is used, for instance. The photodetection control circuit 48 controls detection of the photodetection signal from the photodetection element 9. The photodetection control circuit 48 issues a photodetection control signal 54 and controls the detection of the photodetection signal from the photodetection element 9 so that the first pulsed laser beam after the inputting of the ready signal 56 can be received. The ready signal 56 is inputted with two types of time differences T1 and T2 (where T2>T1) with respect to the reset signal 55 (see FIG. 6). When the ready signal 56 is inputted with the time difference T1, the internal reference light is received. When the ready signal 56 is inputted at the time difference T2, the distance measuring light is received.

The photodetection signal from the photodetection element 9 is amplified by an amplifier 49, and the photodetection signal is inputted to a receiving signal generator 51. The receiving signal generator 51 judges whether intensity of the amplified signal exceeds a predetermined level or not, i.e. whether the light is a reflected distance measuring light from the object to be measured 11 or not. If the light is judged as the reflected distance measuring light, a receiving signal is issued to the sample hold circuit 45 and a counter 52.

The sample hold circuit 45 is synchronized with the receiving signal from the receiving signal generator 51 and performs the sampling of data. The counter 52 counts the receiving signals. When the count number reaches a predetermined value, a count signal is issued to the control arithmetic unit 31. Upon the detection of the count signal, the control arithmetic unit 31 issues a pulse count signal 57 to the light emission and photodetection timing control unit 47.

When the pulse count signal 57 is inputted, the light emission and photodetection timing control unit 47 selects and outputs the light emission timing control signal 53, the reset signal 55, and the ready signal 56.

The sampling data of the photodetection signal is inputted to the control arithmetic unit 31 via the light emission and photodetection timing control unit 47. Based on the sampling data, a distance to the object to be measured 11 is calculated, and this is displayed on the display unit 28 as the result of distance measurement.

Figure 5:
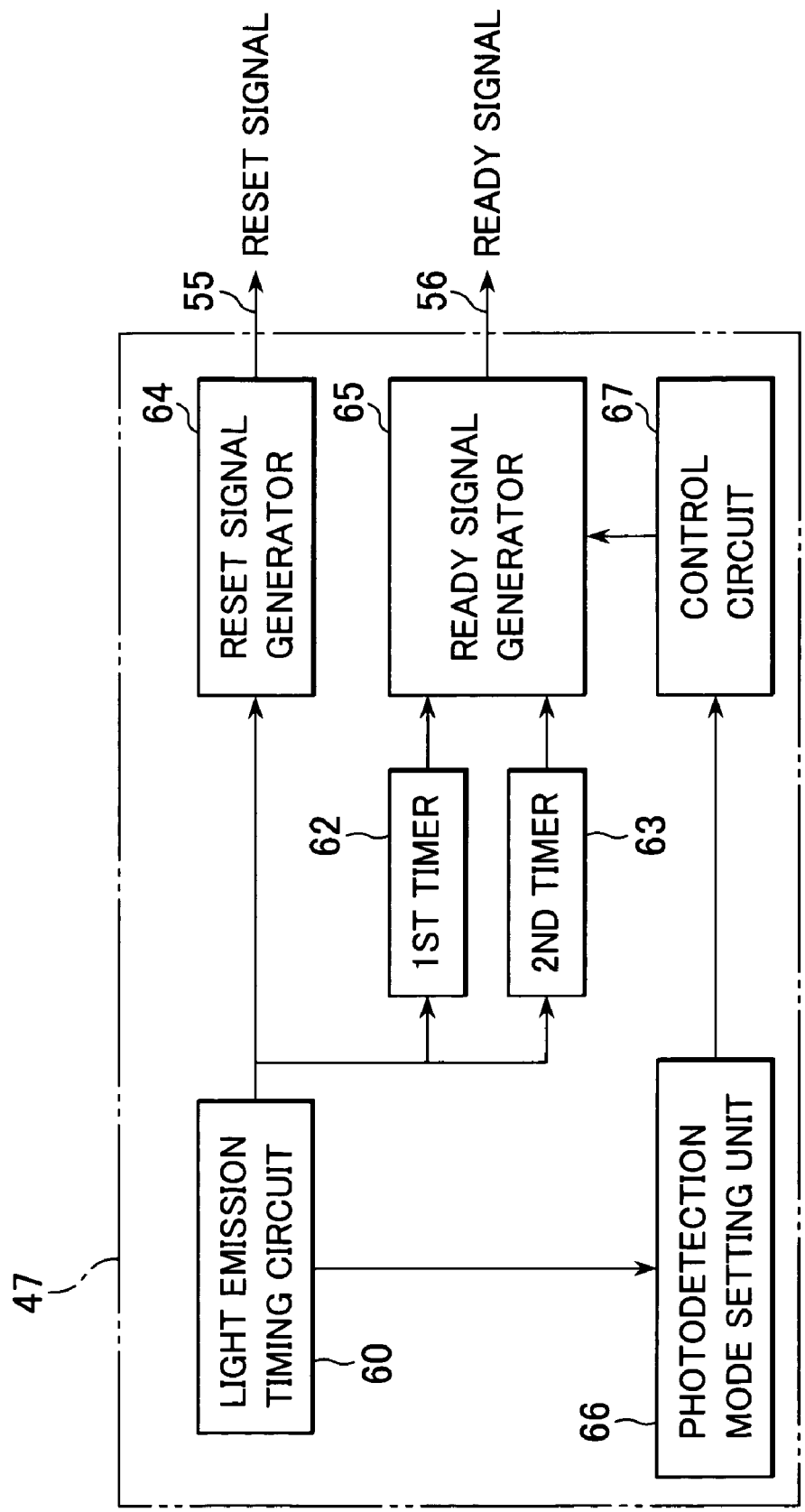
FIG. 5 is a block diagram of a light emission and photodetection timing control unit of a distance measuring unit of the present embodiment.

Further, description will be given on the light emission and photodetection timing control unit 47 referring to FIG. 5.

The light emission and photodetection timing control unit 47 has a light emission timing circuit 60. The light emission timing circuit 60 issues a timing signal which is synchronized with the clock signal issued from the transmitter 41, and the timing signal from the light emission timing circuit 60 is sent to a reset signal generator 64, a first timer 62, and a second timer 63.

When the timing signal is inputted, the reset signal generator 64 issues the reset signal 55. When the timing signal is inputted, the first timer 62 inputs a first time difference signal with the time difference of t1 (see FIG. 6) to the ready signal generator 65. When the timing signal is inputted, the second timer 63 inputs a second time difference signal with the time difference of t2 (t2>TR) to the ready signal generator 65 (see FIG. 6). Based on a command from a control circuit 67, the ready signal generator 65 issues the ready signal 56 in synchronization with the first time difference signal or with the second time difference signal.

The timing signal from the light emission timing circuit 60 is also inputted to a photodetection mode setting unit 66. The photodetection mode setting unit 66 is used to set a switchover mode of the ready signal 56. For instance, setting is made so that the ready signal 56 is issued so as to be alternately synchronized with the first time difference signal and the second time difference signal. Or, setting is made in such manner that, when the ready signal 56 synchronized with a single issue of the first time difference signal is given out, the ready signal 56 synchronized with 100 issues of the second time difference signals is given, or the like.

The control circuit 67 controls the output of the ready signal 56 from the ready signal generator 65 according to the mode, which is set by the photodetection mode setting unit 66.

Now, description will be given on operation referring to FIG. 6.

Based on the clock signal from the transmitter 41, a light emission instruction is issued from the LD driver 43 to the laser light source 6, and a pulsed light is emitted from the laser light source 6. The clock signal is issued, for instance, at a cycle of 8.5 kHz (approximately 120 μs). A distance to be measured by the distance measuring system is set to a range to receive a reflected distance measuring light within the cycle of the clock signal.

From the laser light source 6, a pulsed laser beam is emitted at 8.5 kHz. The pulsed laser beam thus emitted has a peak with a delay of dt from the light emission instruction, for instance.

When the pulsed laser beam is emitted, an internal reference light (hereinafter referred as "internal light") enters the photodetection element 9 via the internal reference light optical path 5 with a delay of TR from the peak of the pulsed laser beam. Next, a reflected distance measuring light (hereinafter referred as "external light") from the object to be measured 11 enters with a delay of TS from the peak of the pulsed laser beam. From the photodetection element 9, photodetection signals of the internal light and the external light are issued as shown in FIG. 6 (B).

The clock signal from the transmitter 41 is also inputted to the light emission and photodetection timing control unit 47. Based on the clock signal, a timing signal is issued from the light emission timing circuit 60. When the timing signal is inputted, the reset signal generator 64 issues the reset signal 55 at the timing of 3/4, for instance, of the cycle of the clock signal, and the reset signal 55 is sent to the photodetection control circuit 48.

When the timing signal is inputted, the first timer 62 issues a first time difference signal with a delay of t1 from the light emission instruction to the ready signal generator 65. The second timer 63 issues a second time difference signal with a delay of t2 from the light emission instruction to the ready signal generator 65.

A detection mode of the photodetection signal is set in advance on the photodetection mode setting unit 66. Specifically, it is set under which condition an internal light receiving signal and an external light receiving signal from the photodetection element 9 are detected. For instance, in case the detection mode is set in such manner that an internal light receiving signal and an external light receiving signal from the photodetection element 9 are alternately detected at the photodetection circuit 40, the photodetection mode setting unit 66 issues a switchover signal to the control circuit 67 for each of the timing signals sent from the light emission timing circuit 60. The control circuit 67 controls whether the timing to issue the ready signal 56 from the ready signal generator 65 for each switchover signal is based on the first time difference signal or based on the second time difference signal.

For example, when a ready signal 56in based on the first time difference signal is inputted to the photodetection control circuit 48, the photodetection control circuit 48 makes it possible to detect from the photodetection element 9 after the ready signal 56in (i.e. after the elapse of the time t1 from the light emission instruction). The value of t1 is set as: t1<dt (see FIG. 6 (C)). The photodetection control circuit 48 controls the photodetection signal from the photodetection element 9 so that only the first photodetection signal after the ready signal 56in can be detected. Therefore, the photodetection element 9 can receive only one internal light with respect to one pulsed laser beam. After only one internal light has been received, the condition of the photodetection element 9 is reset based on the reset signal 55. Further, based on the ready signal 56in, the condition of the photodetection element 9 is turned to ready condition, and the photodetection element 9 can receive the light again (see FIG. 6 (C)).

During the period from the time when the reset signal 55 is inputted to the photodetection control circuit 48 to the time when the ready signal 56 is inputted to the photodetection control circuit 48, it is turned to the same condition as the condition where an electric mask is applied for the light receiving of the photodetection element 9, and the internal light and the external light can be discriminated from each other. The period when the electric mask is applied can be adjusted by changing the time to issue the ready signal 56 as described later.

Next, when the ready signal 56out based on the second time difference signal is inputted to the photodetection control circuit 48, the photodetection control circuit 48 makes it possible to detect the photodetection signal of the photodetection element 9 after the ready signal 56out (i.e. after the elapse of the time t2 from the light emission instruction). The value of t2 is set as: TR<t2 (see FIG. 6 (D)). Optical path length of the internal reference light is physically and structurally known, and the value of TR is already known. Thus, the value of t2 can be set in advance. The photodetection element 9 is in the condition of resetting from the light emission instruction to the ready signal 56out, and the photodetection element 9 cannot receive the light. Therefore, the external light entering the photodetection element 9 prior to the ready signal 56out is not detected, and no detection signal is issued. Only the external light entering after the ready signal 56out is received, and a photodetection signal on the external light is detected (see FIG. 6 (D)).

Figure 6:
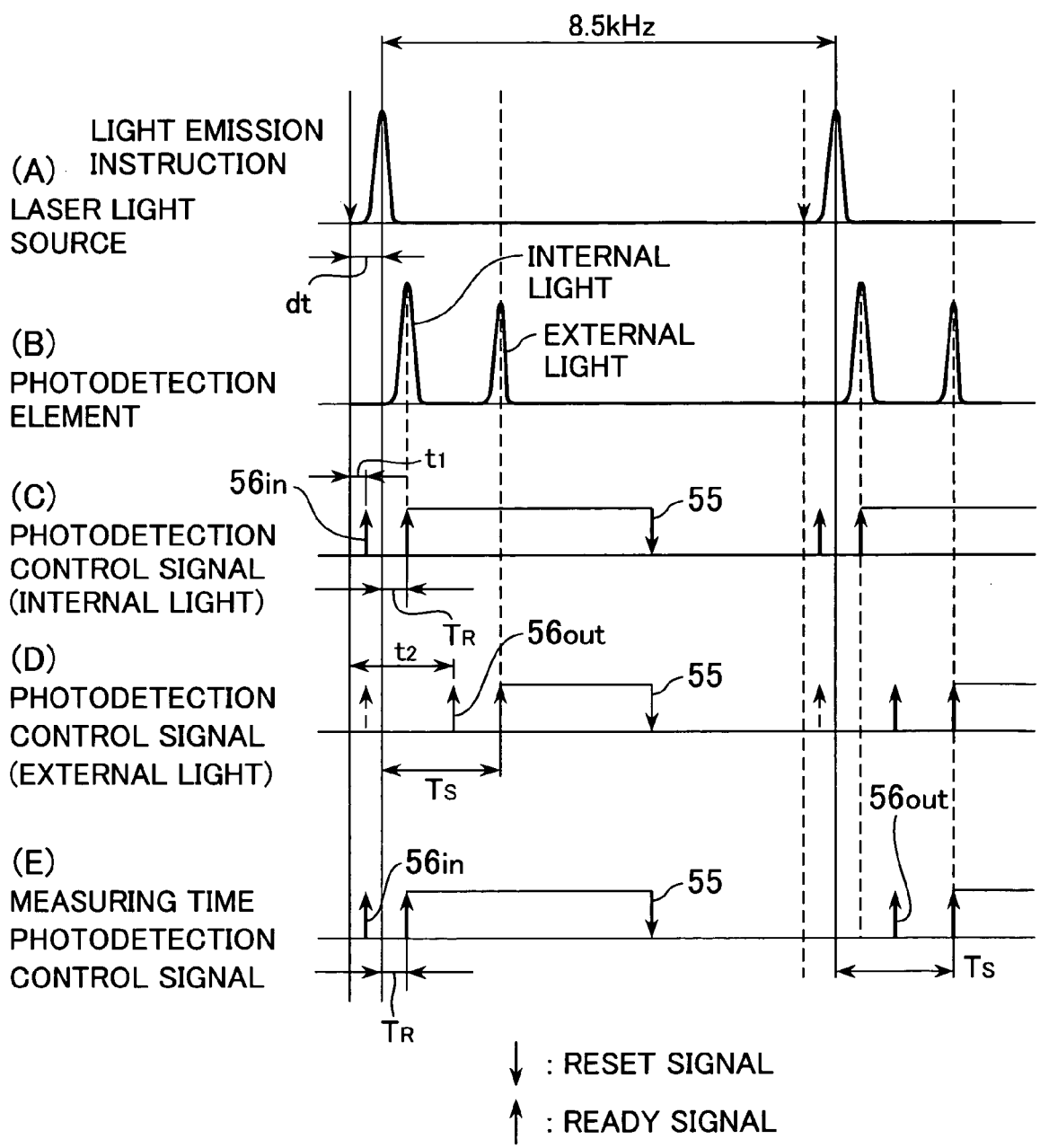
FIG. 6 (A) is a diagram to show light emitting condition of a laser light source.

FIG. 6 (E) shows the condition of the receiving light detection when the ready signal 56in and the ready signal 56out are alternately outputted from the light emission and photodetection timing control unit 47 together with the reset signal 55. When the ready signal 56in and the ready signal 56out are alternately inputted to the photodetection control circuit 48, the photodetection element 9 can alternately receive the light by discriminating the internal light and the external light from each other.

By obtaining the time difference between the detection signal of the internal light and the detection signal of the external light, it is possible to measure the distance to the object to be measured 11.

As described above, photodetection of the internal light and photodetection of the external light can be switched over electrically. This makes it possible to perform switchover for each one pulsed laser beam at high speed. There is no dead time during the switchover, and effective measuring time is longer, and the time for measurement can be reduced. Thus, it is possible to eliminate the influence of drift in the circuit unit of the distance measurement arithmetic unit, and this contributes to the improvement of the accuracy in the distance measurement.

If consideration is given on an S/N ratio of the external light and an S/N ratio of the internal light, the internal light is less influenced by disturbance light, and an S/N ratio of the internal light is high enough. On the other hand, the external light is easily influenced by disturbance light, and an S/N ratio of the external light is lower than an S/N ratio of the internal light. Therefore, if the measurement time is the same, effect of averaging of the measurement is higher when more data of the external light is obtained than the data of the internal light, and this contributes to the improvement of the measurement accuracy.

As described above, it is set at the photodetection mode setting unit 66 in such manner that, when the ready signal 56in synchronized with a single issue of the first time difference signal is given out, the ready signal 56out synchronized with 100 issues of the second time difference signals is given out, for instance. If it is supposed that the measurement time is the same as in the past, an amount of the acquired data is extensively increased, and the accuracy of distance measurement is improved. Also, equal data amount to data amount in the past can be acquired within short time, and the measurement can be made within short time without decreasing the accuracy in the distance measurement.

As a result of that measurement time is reduced, it is possible to perform distance measurement for an object moving at high speed, while this has been regarded as inappropriate in the past.

Figure 7:
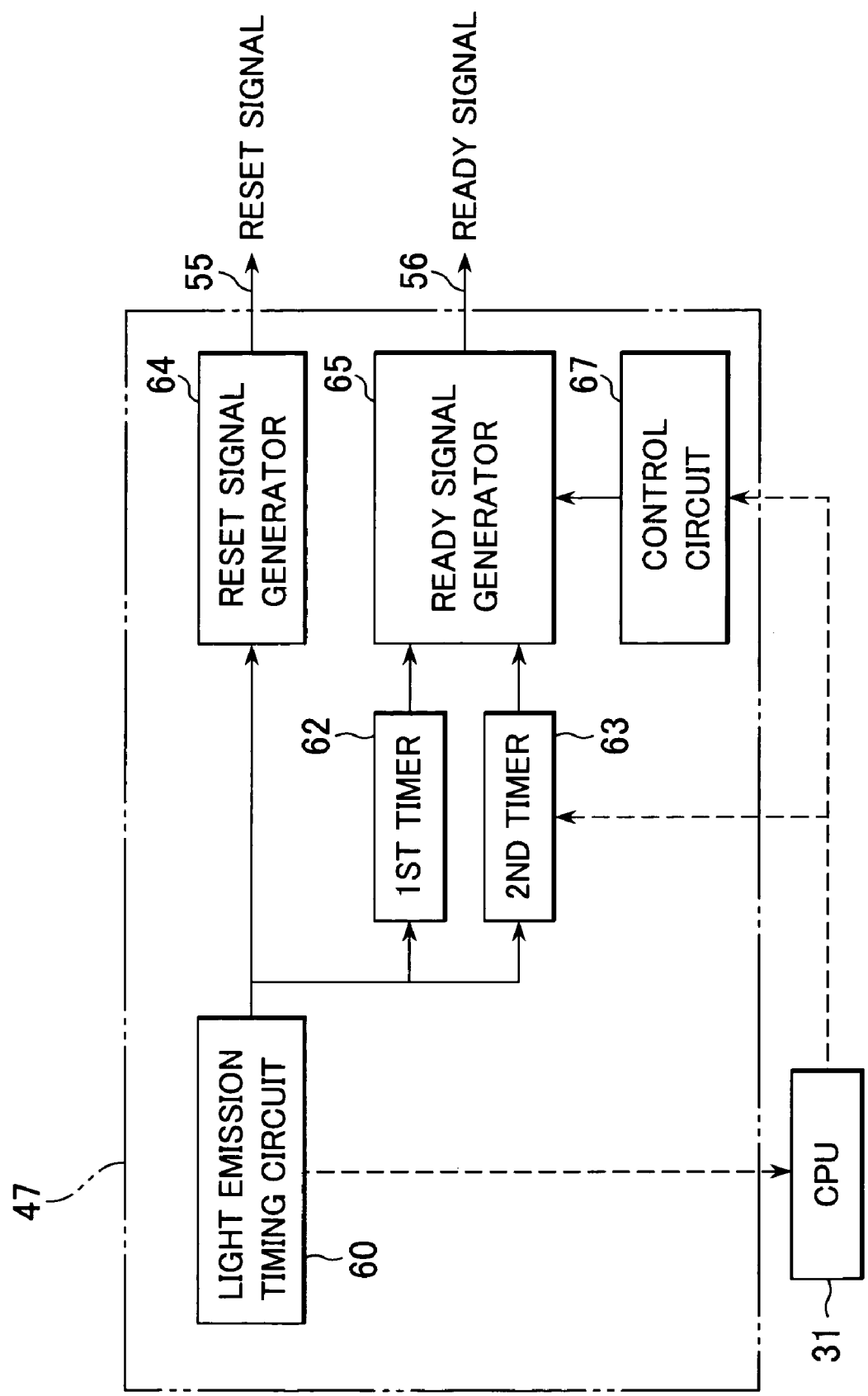
FIG. 7 is a block diagram of a light emission and photodetection timing control unit in a second embodiment of the present invention.

FIG. 7 represents a second embodiment of the invention.

In the second embodiment, the value of the time difference t2 of the second timer 63 is made variable at the control arithmetic unit 31, and the switchover of the ready signal 56in and the ready signal 56out based on the time difference signals from the first timer 62 and the second timer 63 by the control circuit 67 is made variable.

Now, description will be given on a case where the value of the time difference t2 of the second timer 63 is made variable by the control arithmetic unit 31.

Figure 2:
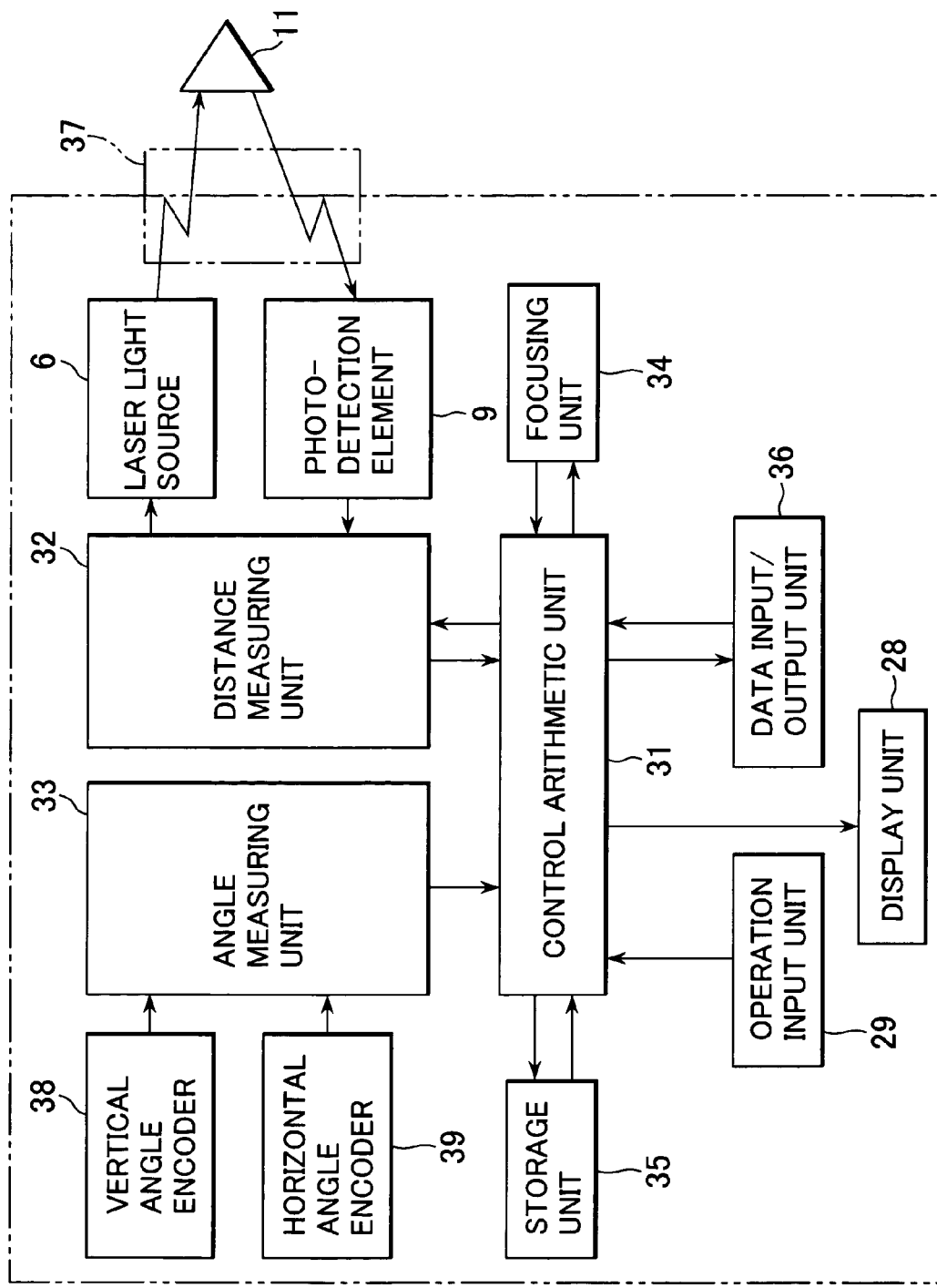
FIG. 2 is a block diagram showing general features of an embodiment of the present invention.

As shown in FIG. 2, a feedback signal of the focusing condition from the focusing unit 34 is inputted to the control arithmetic unit 31. As the feedback signal of the focusing condition, a position of the focusing lens is detected by a linear sensor or the like, and this is used as the feedback signal. Approximate value of the distance to the object to be measured 11 which is collimated can be calculated based on the feedback signal by the control arithmetic unit 31. Further, based on the distance thus calculated, the time difference t2 can be calculated. The control arithmetic unit 31 issues a control signal based on the time difference t2 to the control circuit 67, and the control circuit 67 issues the ready signal 56out, which makes the time difference t2. Because the detection of the photodetection signal from the photodetection element 9 is limited by the ready signal 56out of the time difference t2, the external light entering during the time difference t2 is not detected any more. That is, it is possible to out off the reflected light from unnecessary reflective body, which is present in front of the object to be measured 11.

For example, in case a metal net or trees are present between the object to be measured 11 and the distance measuring system or in case the distance to the object to be measured 11 must be measured through a transparent glass, the measurement can be made in stable manner and the accuracy of measurement is also improved.

Of course, the time difference t2 of the ready signal 56out may be changed manually via the control arithmetic unit 31 from the operation input unit 29 without relying on the feedback signal of the focusing condition.

Also, the setting and the changing of the photodetection mode can be made by the control arithmetic unit 31. For example, when the conditions of external atmosphere are not stable, effects of averaging can be increased by increasing the number of photodetection (light receiving) operations of the external light without changing the number of photodetecting operations of the internal light. Or, the amount of the acquired data can be decreased in case of the measurement where strict accuracy is not required.

What is claimed is:

1. A distance measuring system for measuring a distance based on photodetection of an external light and an internal light by projecting a pulsed laser beam to an object to be measured and by receiving said external light reflected by the object to be measured and said internal light which is a divided part of said laser beam, comprising a laser light source for emitting said pulsed laser beam based on a light emission instruction, a photodetection element capable of receiving said external light and said internal light, an optical system where said external light and said internal light enter said photodetection element at the same time, a photodetection control unit for electrically controlling the photodetection condition of said photodetection element, and a light emission and photodetection timing control unit for issuing a ready signal based on said light emission instruction, wherein said photodetection control unit enables said photodetection element to receive a first pulsed laser beam entering after the ready signal based on the ready signal, and said light emission and photodetection timing control unit generates the ready signal before or after a time when said photodetection element receive said internal light, wherein said light emission and photodetection timing control unit issues more ready signals after the time when said photodetection element receives said internal light than the ready signals issued before the time when said photodetection element receives said internal light.

2. A distance measuring system for measuring a distance based on photodetection of an external light and an internal light by projecting a pulsed laser beam to an object to be measured and by receiving said external light reflected by the object to be measured and said internal light which is a divided part of said laser beam, comprising a laser light source for emitting said pulsed laser beam based on a light emission instruction, a photodetection element capable of receiving said external light and said internal light, an optical system where said external light and said internal light enter said photodetection element at the same time, a photodetection control unit for electrically controlling the photodetection condition of said photodetection element, and a light emission and photodetection timing control unit for issuing a ready signal based on said light emission instruction, wherein said photodetection control unit enables said photodetection element to receive a first pulsed laser beam entering after the ready signal based on the ready signal, and said light emission and photodetection timing control unit generates the ready signal before or after a time when said photodetection element receive said internal light, wherein said light emission and photodetection timing control unit makes a changeable time difference between the ready signal issued after the time when said photodetection element receives said internal light and the ready signal issued before the time when said photodetection element receives said internal light.

3. A distance measuring system according to claim 1, wherein said ready signal is issued alternately before and after the time when said photodetection element receives said internal light.

4. A distance measuring system according to claim 1, wherein said light emission and photodetection timing control unit makes a changeable time difference between the ready signal issued after the time when said photodetection element receives said internal light and the ready signal issued before the time when said photodetection element receives said internal light.

5. A distance measuring system according to claim 1, further comprising a focusing unit, wherein a control unit calculates an approximate value of a distance to the object to be measured based on a feedback signal of the focusing condition by said focusing unit, and a ready signal is issued based on the result of said calculation.

6. A distance measuring system according to claim 2, wherein said ready signal is issued alternately before and after the time when said photodetection element receives said internal light.

7. A distance measuring system according to claim 2, wherein said light emission and photodetection timing control unit issues more ready signals after the time when said photodetection element receives said internal light than the ready signals issued before the time when said photodetection element receives said internal light.

8. A distance measuring system according to claim 2, further comprising a focusing unit, wherein a control unit calculates an approximate value of a distance to the object to be measured based on a feedback signal of the focusing condition by said focusing unit, and a ready signal is lissued based on the result of said calculation.

* * * * *